(12) United States Patent
Fekete et al.

(10) Patent No.: US 6,298,728 B1
(45) Date of Patent: Oct. 9, 2001

(54) ROTATIONAL TURBOCHARGER SPEED DETECTOR

(75) Inventors: Nicholas Fekete, Fellbach; Karsten Finger, Stuttgart; Lothar Welte, Geislingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/296,470

(22) Filed: Apr. 22, 1999

(30) Foreign Application Priority Data

Apr. 23, 1998 (DE) .............................................. 198 18 124

(51) Int. Cl.$^7$ ....................................................... G01P 3/02
(52) U.S. Cl. .............................. 73/660; 73/514.39; 73/493
(58) Field of Search ........................ 73/660, 488, 514.39, 73/493; 324/162, 166

(56) References Cited

U.S. PATENT DOCUMENTS

| 2,679,629 | * | 5/1954 | Hellar | 73/660 |
| 4,864,859 | | 9/1989 | Jensen | 73/473 |
| 5,635,646 | * | 6/1997 | Eriksson | 73/660 |

FOREIGN PATENT DOCUMENTS

| 257 126 | 6/1988 | (DE) . |
| 269 683 | 7/1989 | (DE) . |
| 40 11 938 | 10/1990 | (DE) . |
| 43 28 686 | 3/1995 | (DE) . |
| 296 15 274 | 2/1998 | (DE) . |
| 0 701 134 | 3/1996 | (EP) . |
| 2 431 704 | 2/1980 | (FR) . |
| 56-168560 | 12/1981 | (JP) . |
| 60-222775 | 11/1985 | (JP) . |

* cited by examiner

*Primary Examiner*—John E. Chapman
(74) *Attorney, Agent, or Firm*—Crowell & Moring LLP

(57) ABSTRACT

An arrangement for detecting the turbocharger rotational speed on internal-combustion engines is provided with at least one piezoelectric acceleration sensor fixed on the turbocharger and with an analyzing circuit having an analog filter arrangement for filtering the output signals of the acceleration sensor. The output signals of the filter arrangement are fed by way of a frequency-to-voltage converter in the form of an analog voltage, or directly in the form of frequency signals, as input signals to an electronic control unit of the internal-combustion engine or to a measuring and/or display unit. As a result, the turbocharger rotational speed can be detected at a reasonable cost with a small and robust arrangement suitable for mass production and requiring no constructional changes on the turbocharger.

14 Claims, 2 Drawing Sheets

ROTATIONAL TURBOCHARGER SPEED DETECTOR

BACKGROUND AND SUMMARY OF THE INVENTION

This application claims the priority of German Application No. 198 18 124.8, filed Apr. 23, 1998, the disclosure of which is expressly incorporated by reference herein.

The invention relates to an arrangement for detecting the rotational speed of turbochargers on an internal-combustion engine through the use of a piezoelectric acceleration sensor.

A simple and reliable detection of the rotational turbocharger speed under all operating conditions (load and rotational speed) is the basic prerequisite for the efficient operation of a modern internal-combustion engine equipped with a turbocharger. The detected rotational speed can then be used as a control variable for automatically controlling the turbocharger and the whole characteristic diagram in the charger operation of the engine. As a result of detecting the rotational speed, it is possible to operate the turbocharger at its maximal rotational speed limit and prevent possible destruction resulting from overspeed operation. As a result, control-technical interventions are permitted in the whole engine control system.

Known arrangements for detecting the rotational turbocharger speed are based on optical and inductive processes. These processes require considerable implementing expenditures. It is known to photo-electrically or inductively scan the charger blades or additionally mounted pulse wheels on the turbocharger shaft. The scanned results are then analyzed in a high-quality electronic analyzing system coupled to receive the scanned signals.

From German Patent documents DD 257 126 and DD 269 683, it is known to mount piezoelectric acceleration sensors on the housing of rotating machines in order to thus detect the rotational speed. For analyzing the signal detected in the acceleration sensor and processed, the frequency-amplitude spectrum of the signal is determined in a signal analyzer connected on the output side, the rotational speed being determined from one of the rotational-speed-dependent resonances or on the highest occurring peaks and by a mathematical transformation. Although a very precise detection of the rotational speed can be carried out as a result, with respect to the space requirements and costs, such a high-expenditure electronic system is not suitable for a standard application in a motor vehicle.

From U.S. Pat. No. 4,864,859, it is known to mount piezoelectric acceleration sensors on housings of turbochargers. However, this known arrangement is not used for the detection of rotational speeds but rather for determining and eliminating unbalanced masses of the rotating system.

It is an object of the present invention to provide a simple arrangement for detecting turbocharger rotational speed at reasonable cost while being suitable for mass production.

According to the invention, this object is achieved by an arrangement for detecting the turbocharger rotational speed having at least one piezoelectric acceleration sensor which is fixed on the turbocharger and is constructed as a knock sensor, and having an analyzing unit with an analog filter arrangement for filtering the output signals from the acceleration sensor. The output signals of the filter arrangement, by way of a frequency-to-voltage converter in the form of an analog voltage or directly in the form of frequency signals, are provided as input signals for an electronic control unit of the internal-combustion engine or for a measuring and/or display unit.

The arrangement according to the invention has the significant advantage that the construction of the turbocharger is not important for detecting the rotational speed. In this case, the piezoelectric acceleration sensor can also be mounted subsequently in a simple manner on the turbocharger without the necessity of opening or reconfiguring this turbocharger. The rotational speed of the turbocharger can be detected in a very simple and low-cost manner. In conjunction with an achieved robust construction and a simple mounting, this arrangement is suitable for mass production at reasonable cost and for the rough operation in the motor vehicle. In this case, measurements of rotational turbocharger speeds can be carried out in a simple and low-cost manner. Since, as the result of the rotational speed detection, the turbocharger can be operated at its maximal rotational speed limit and a destruction due to overspeed hardly presents a problem, lower-cost smaller turbochargers can be used. The starting hesitation of vehicles is reduced; the gear shift level adaptation presents no problems; and a better overall efficiency of the internal-combustion engine can be achieved in every-day operation.

The piezoelectric acceleration sensor according to the invention is advantageously a commercially available knock sensor which is available in a fully developed state as a mass produced product for the automatic knock control of internal-combustion engines. It can also be used for the rotational speed detection of turbochargers at reasonable cost.

As the result of the measures described herein, advantageous further developments and improvements of the arrangement according to the invention can be achieved.

The at least one acceleration sensor is expediently arranged on the compressor housing of the turbocharger, where the vibration signals are the clearest and the best prerequisites exist for a mechanical fastening.

For synchronizing a turbocharger arrangement (such as a bi-turbo) consisting of two turbochargers on an internal-combustion engine, each of these turbochargers is expediently connected with an acceleration sensor and a corresponding analyzing circuit. In this case, devices for forming a differential rotational speed signal or a differential mode voltage by which this synchronization can be implemented are provided in the analyzing circuit or in the electronic control unit.

In the simplest case, the filter arrangement is constructed as a band pass filter.

In order to, for example, protect against excess voltages, a corresponding limiter circuit can advantageously be connected directly to the output side of the acceleration sensor.

In an implementation of the analyzing circuit which requires higher technical expenditures but is more exact, a comparator (particularly a comparator with a hysteresis) can be connected to the output side of the filter arrangement. If the electronic control unit requires an analog voltage signal as the rotational speed signal, then a low-pass filter follows the frequency-to-voltage converter provided for this purpose in order to filter out possibly remaining higher-frequency parts.

The acceleration sensor is expediently connected by way of a connection cable with an input of the electronic control unit or, for measuring purposes, with the measuring and/or display unit in order to supply measuring signals to the latter. In a first advantageous further embodiment, the analyzing circuit is integrated in the housing of the acceleration sensor, and the input of the electronic control unit or of the measuring and/or display unit is constructed as a frequency input or analog input. This depends on whether or not a frequency-to-voltage converter is provided.

In an alternative advantageous further embodiment, the analyzing circuit is integrated in a plug of the connection cable or in the connection cable itself. In this case, the input of the electronic control unit or of the measuring and/or display unit is then again constructed as a frequency input or analog input.

As a third advantageous embodiment of the invention, the analyzing circuit is arranged in the electronic control unit or in the measuring and/or display unit. In this case, the input of the electronic control unit or of the measuring and/or control unit is then constructed as an input of the analyzing circuit.

Other objects, advantages and novel features of the present invention will become apparent from the following detailed description of the invention when considered in conjunction with the accompanying drawings.

DETAILED DESCRIPTION OF THE DRAWINGS

Figure 1:
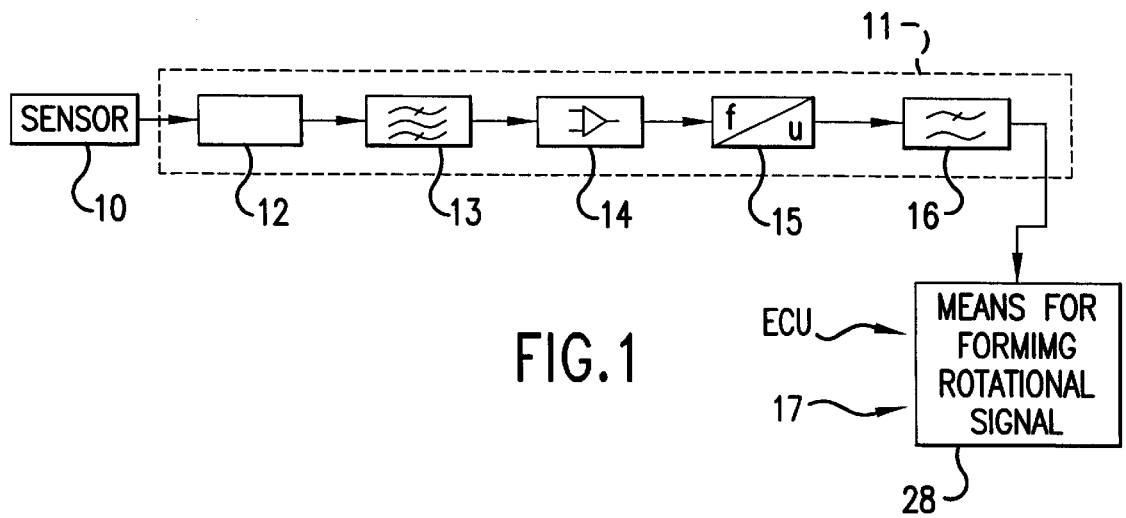
FIG. 1 is a block diagram of an analyzing circuit connected with a piezoelectric acceleration sensor according to the present invention.

For detecting the rotational turbocharger speed of a turbocharger (not shown), a piezoelectric acceleration sensor 10, which is constructed particularly as a commercially available knock sensor, is fixed on the housing of this turbocharger. For example, it is fixed on the turbocharger compressor housing 21. The signal detected by the accelerator sensor 10 is proportional to the acceleration measured on the housing of the turbocharger, and this acceleration, in turn, is proportional to the unbalanced mass generated by the rotating turbocharger shaft. Since these unbalanced-mass signals occur synchronously with the rotation, the signal detected by the acceleration sensor 10 is proportional to the rotational speed, naturally superimposed by interference pulses and other influences.

For analyzing and processing the signal emitted by the acceleration sensor 10, an analyzing circuit 11 is connected on its output side. This analyzing circuit 11 consists of the series connection of a voltage limeter 12 with a band pass filter 13, a comparator 14, a frequency-to-voltage converter 15 and a low-pass filter 16. The output signal of the analyzing circuit 11 is supplied in the form of an analog signal to an electronic control unit 17 for controlling functions of an internal-combustion engine (also not shown). Such a control unit is normally used, for example, for controlling the fuel feed and/or the ignition and/or the transmission control or the like of the engine and vehicle. In the present case, the turbocharger is also controlled, for example, by a guide blade adjustment and/or by way of controlling a waste gate.

The measuring signals of the acceleration sensor 10 are guided by way of the voltage limiter 12, which is used, for example, for protecting against excess voltages, and are then filtered in the band pass filter 13 with suitable limit frequencies. As a result, the interfering parts are filtered out so that the useful signal clearly differs from the measuring signal. This useful signal represents the rotational speed of the turbocharger shaft. The residual unbalanced mass of the turbocharger always provides an inertia force which excites the bearing and rotates at the rotational speed of the charger shaft and rises with the square of the rotational speed. By determining the time from one zero crossing to the next of the useful signal representing a vibration signal, the time for one charger shaft rotation can be determined.

If an amplification of the signal is required or desired, a corresponding amplifier arrangement (not shown), can be connected on the output side of the voltage limiter 12. In this case, the amplification factor can be automatically adjustable (the so-called well known "automatic gain control"). Furthermore, the band pass filter 13 may be constructed as a variable filter; that is, with automatically adjusting limiting frequencies.

As the result of the comparator 14 connected on the output side and having a hysteresis, the useful signal is converted to a rectangular signal which, in the following frequency-to-voltage converter 15, is converted to an analog voltage which is proportional t o this frequency, thus to the rotational speed. By means of the subsequent low-pass filtering in the low-pass filter 16, a smoothing or averaging of the analog voltage signal takes place. The smoothed or averaged signal is fed as an actual quantity of the rotational turbocharger speed to the electronic control unit 17 where a differential rotational signal is formed by means 28 in control unit 17. This differential one arm can also be formed in the analogue 11.

As a modification of the illustrated embodiment, in a simpler version, the comparator 14 may be eliminated. This means the useful signal filtered in the band pass filter 13 is converted directly in the frequency-to-voltage converter 15 into a rotational-speed-proportional voltage.

For some applications, the electronic control unit 17 does not need an analog voltage as the rotational turbocharger speed signal but requires a frequency signal. In this case, the frequency-to-voltage converter 15 as well as the low pass filter 16 can be eliminated. This means that in the simplest case the analyzing circuit 11 consists only of the band pass filter 13.

If two turbochargers (TURBO 1 and TURBO 2) (bi-turbo) are provided on an internal-combustion engine, an acceleration sensor 10, 10' or a knock sensor is mounted on each turbocharger and is in each case provided with a corresponding analyzing circuit 11, 11'. This permits the synchronization of these two turbochargers, for the purpose of which a differential rotational speed signal or a differential voltage signal is formed from the rotational-speed-proportional output signals.

Figure 2:
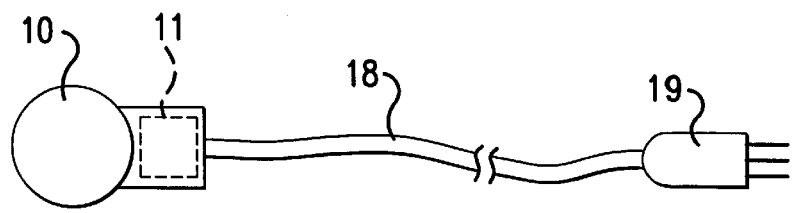
FIG. 2 is a view of an arrangement in which the analyzing circuit is integrated in the housing of the acceleration sensor.

In the advantageous further embodiment illustrated in FIG. 2, the analyzing circuit 11 is integrated in the housing of the piezoelectric acceleration sensor 10 constructed as a knock sensor. The output signal of this analyzing circuit 11 is fed by way of a connection cable 18, which is provided on its end away from the acceleration sensor 10 with a plug 19, to the electronic control unit 17. Of course, the electronic control unit 17 is provided with a corresponding jack which, according to the construction, is designed as a frequency input or an analog input.

Figure 3:
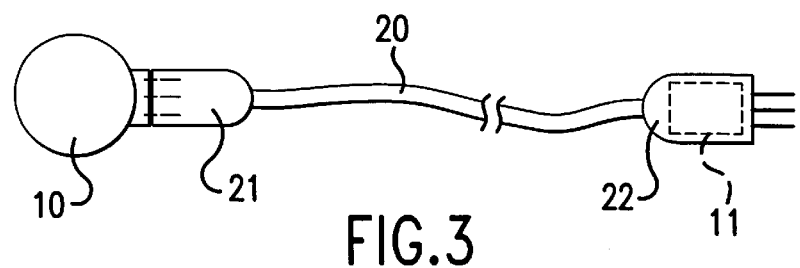
FIG. 3 is a view of an arrangement in which the analyzing circuit is integrated in a plug of a connection cable between the acceleration sensor and the electric control unit.

In the alternative further embodiment illustrated in FIG. 3, a connection cable 20 is illustrated which has two end-side plugs 21, 22. One plug 21 is inserted in a corresponding jack of the housing of the acceleration sensor 10, while the second plug 22 is inserted into the corresponding jack of the electronic control unit 17. The analyzing circuit 11 is integrated in the plug 22. As an alternative, it may naturally also be integrated in the plug 21 or in an intermediate position along the cable. In a third variant (not shown), the analyzing circuit 11 may also be arranged in the electronic control unit 17. The connection cable 18 or 20 is then inserted by means of a plug into an input jack of this analyzing circuit 11.

The analyzing circuit 11 as a whole can be integrated in an IC chip so that accommodation within the housing of the acceleration sensor 10, in a plug 21, 22, or in the connection cable 20 presents no problem.

Figure 4:
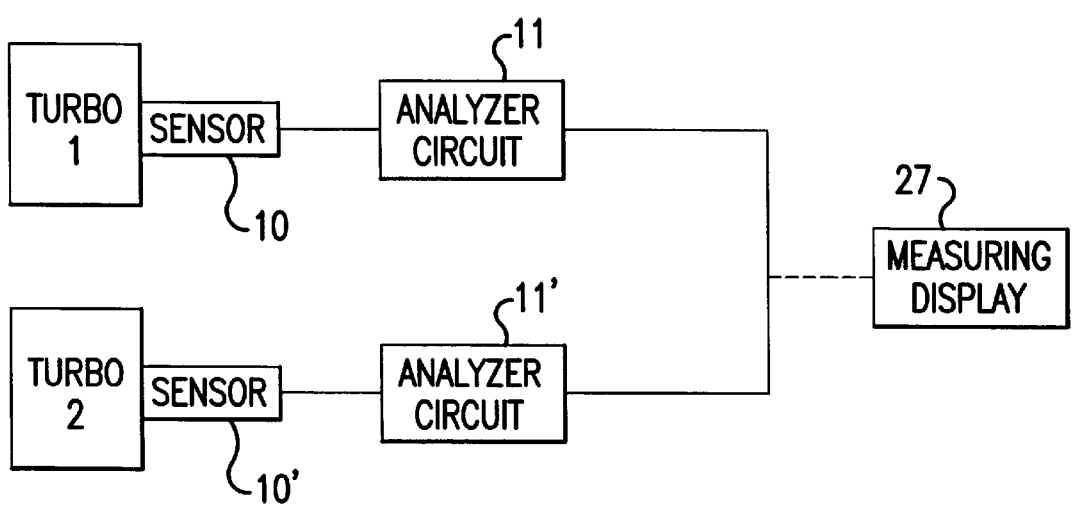
FIG. 4 is a block diagram showing the analyzer circuit connected to a measuring/display unit.

An arrangement for detecting the rotational speed according to the invention can also be used only for measuring purposes in the lab or on the motor vehicle. In this case, the analyzing circuit is not connected with the electronic control unit 17 but with a measuring and/or display unit as shown in FIG. 4, in order to be able to detect the rotational speed and display it. Also in this case, the acceleration sensor 10 can be connected by way of a corresponding cable 18 or 20 with this measuring and/or display unit, in which case the analyzing circuit 11 may also be integrated in the measuring and/or display unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotational speed detector for a turbocharger arranged of two turbochargers on an internal-combustion engine, comprising:
    at least one piezoelectric acceleration sensor fixed on each of the turbochargers and constructed as a knock sensor, the sensor providing output signals;
    an analyzing unit receiving the output signals and including an analog filter arrangement which filters the output signals from the acceleration sensor to provide filtered output signals; and
    wherein the filtered output signals are provided as input signals to an electronic control unit of the internal-combustion engine or a measuring unit either by way of a frequency-to-voltage converter in the form of an analog voltage or directly in the form of frequency signals wherein said analyzing unit or said control unit comprises means for forming a differential rotational signal.

2. The detector according to claim 1, wherein the at least one acceleration sensor is fixedly arranged on a compressor housing of the turbocharger.

3. The detector according to claim 1, wherein the filter arrangement is a band pass filter.

4. The arrangement according to claim 1, further comprising a limiter circuit is assigned to the acceleration sensor.

5. The detector according to claim 4, wherein the limiter circuit is connected directly behind the acceleration sensor and receives the output signals.

6. The detector according to claim 1, wherein said analyzing unit further comprises a comparator, coupled behind the filter arrangement.

7. The detector according to claim 6, wherein the comparator includes a hysteresis.

8. The detector according to claim 6, wherein the frequency-to-voltage converter is connected in the analyzing circuit behind the comparator.

9. The detector according to claim 1, wherein the frequency-to-voltage converter is connected in the analyzing circuit behind the filter arrangement.

10. The detector according to claim 1, wherein the filtered output signals are provided by a frequency-to-voltage converter and wherein the analyzing unit further comprises a low-pass filter connected to an output of the frequency-to-voltage converter.

11. The detector according to claim 1, further comprising a connection cable coupling the acceleration sensor with an input of the electronic control unit or the measuring unit.

12. The detector according to claim 11, wherein the analyzing unit is integrated in a housing of the acceleration sensor, and further wherein an input of at least one of the electronic control unit and measuring and/or display unit is configured as one of a frequency and analog input.

13. The detector according to claim 11, wherein the analyzing unit is integrated in a plug of the cable and further wherein an input of at least one of the electronic control unit and measuring and/or display unit is configures as one of a frequency and analog input.

14. The detector according to claim 11, wherein the analyzing unit is arranged in one of the electronic control unit and measuring and/or display unit, and further wherein an input of said one electronic control unit or measuring and/or display unit is configured as an input of the analyzing unit.

* * * * *